(12) United States Patent
Janssen

(10) Patent No.: US 9,083,045 B2
(45) Date of Patent: Jul. 14, 2015

(54) COMPOSITE MATERIALS, PRODUCTION THEREOF AND USE THEREOF IN ELECTRICAL CELLS

(75) Inventor: Nicole Janssen, Bermersheim (DE)

(73) Assignee: BASF SE, Ludwigshafen (DE)

( * ) Notice: Subject to any disclaimer, the term of this patent is extended or adjusted under 35 U.S.C. 154(b) by 221 days.

(21) Appl. No.: 13/116,360

(22) Filed: May 26, 2011

(65) Prior Publication Data

US 2011/0318654 A1    Dec. 29, 2011

Related U.S. Application Data

(60) Provisional application No. 61/349,218, filed on May 28, 2010.

(51) Int. Cl.
| | |
|---|---|
| *H01M 4/02* | (2006.01) |
| *H01M 4/58* | (2010.01) |
| *H01M 4/136* | (2010.01) |
| *H01M 4/62* | (2006.01) |

(Continued)

(52) U.S. Cl.
CPC ............... *H01M 4/58* (2013.01); *H01M 4/136* (2013.01); *H01M 4/5815* (2013.01); *H01M 4/622* (2013.01); *H01M 4/624* (2013.01); *H01M 4/1397* (2013.01); *H01M 4/16* (2013.01); *H01M 4/362* (2013.01); *H01M 4/625* (2013.01); *H01M 4/668* (2013.01); *H01M 10/052* (2013.01); *H01M 10/058* (2013.01); *H01M 10/0569* (2013.01); *H01M 10/3909* (2013.01); *Y02E 60/122* (2013.01)

(58) Field of Classification Search
CPC .......... H01M 10/052; H01M 10/0525; H01M 10/0569; H01M 10/058; H01M 10/3909; H01M 2/1646; H01M 2/166; H01M 4/136; H01M 4/58; H01M 4/5815; H01M 4/622; H01M 4/624; H01M 4/625; H01M 4/16; H01M 4/362; H01M 4/668; H01M 4/1397; Y02E 60/122
USPC ........................ 429/314, 209, 231.9, 231.95
See application file for complete search history.

(56) References Cited

U.S. PATENT DOCUMENTS

| | | | |
|---|---|---|---|
| 7,745,528 B2 | 6/2010 | Prud'Homme et al. | |
| 2007/0287060 A1* | 12/2007 | Naoi et al. | 429/122 |

(Continued)

FOREIGN PATENT DOCUMENTS

| | | |
|---|---|---|
| CN | 101558455 A | 10/2009 |
| WO | WO 2009/143405 A2 | 11/2009 |

OTHER PUBLICATIONS

Wang, et al., "Sulfur Composite Cathode Materials for Rechargeable Lithium Batteries", Advanced Functional Materials, vol. 13 No. 6, Jun. 2003, pp. 487-492.*

(Continued)

*Primary Examiner* — Patrick Ryan
*Assistant Examiner* — Ben Lewis
(74) *Attorney, Agent, or Firm* — Oblon, McClelland, Maier & Neustadt, L.L.P.

(57) ABSTRACT

A composite material comprising a reaction product of
(A) at least one organic polymer,
(B) sulfur and
(C) carbon in a polymorph which comprises at least 60% $sp^2$-hybridized carbon atoms,
and additionally particles or domains which comprise carbon (C) filled with sulfur (B).

16 Claims, 1 Drawing Sheet

(51) Int. Cl.
  *H01M 4/16* (2006.01)
  *H01M 4/1397* (2010.01)
  *H01M 4/66* (2006.01)
  *H01M 4/36* (2006.01)
  *H01M 10/39* (2006.01)
  *H01M 10/052* (2010.01)
  *H01M 10/0569* (2010.01)
  *H01M 10/058* (2010.01)

(56) References Cited

U.S. PATENT DOCUMENTS

2010/0096597 A1  4/2010  Prud'Homme et al.
2010/0261050 A1* 10/2010 Kang et al. .................. 429/185
2011/0003189 A1  1/2011  Hildebrandt et al.
2011/0186789 A1  8/2011  Samulski et al.

OTHER PUBLICATIONS

Jiulin Wang, et al., "Sulfur Composite Cathode Materials for Rechargeable Lithium Batteries", Advanced Functional Materials, vol. 13 No. 6, Jun. 2003, pp. 487-492.

Peng Wang, "The Nature of the Interaction Between Polyaniline and 2,5-Dimercapto-1,3,4-thiadiazole in Electrochemical Redox Processes", Journal of the Electrochemical Society, vol. 149, 2002, pp. A1171-A1174.

Jiulin Wang, et al., "Electrochemical characteristics of sulfur composite cathode materials in rechargeable lithium batteries", Journal of Power Sources, vol. 138, 2004, pp. 271-273.

Jiulin Wang, et al., "A Novel Conductive Polymer-Sulfur Composite Cathode Material for Rechargeable Lithium Batteries", Advanced Materials, vol. 14, No. 13-14, Jul. 4, 2002, pp. 963-965.

Jiulin Wang, et al., "Room Temperature Na/S batteries with sulfur composite cathode materials", Electrochemistry Communications, vol. 9, 2007, pp. 31-34.

Xiangming He, et al., "Charge/discharge characteristics of sulfur composite electrode at different temperature and current density in rechargeable lithium batteries", Ionics, vol. 14, 2008, pp. 335-337.

Xiangming He, et al., "Charge/discharge characteristics of sulfur composite cathode materials in rechargeable lithium batteries", Electrochimica Acta, vol. 52, 2007, pp. 7372-7376.

International Search Report issued Sep. 29, 2011, in Patent Application No. PCT/IB2011/052353.

* cited by examiner

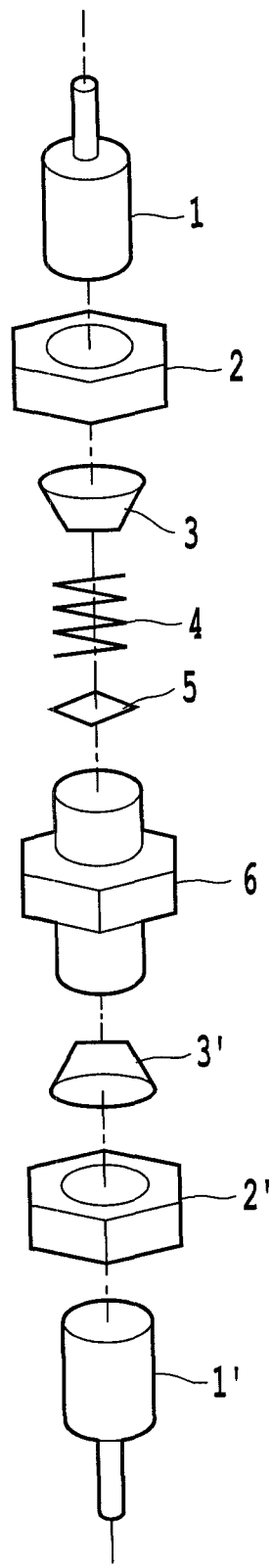

COMPOSITE MATERIALS, PRODUCTION THEREOF AND USE THEREOF IN ELECTRICAL CELLS

This patent application claims the benefit of U.S. provisional patent application Ser. No. 61/349,218, filed May 28, 2010, incorporated in its entirety herein by reference.

The present invention relates to a composite material comprising a reaction product of
(A) at least one organic polymer,
(B) sulfur and
(C) carbon in a polymorph which comprises at least 60% $sp^2$-hybridized carbon atoms,
and additionally particles or domains which comprise carbon (C) filled with sulfur (B).

The present invention further relates to a process for producing inventive composite materials. The present invention further relates to the use of inventive composite materials.

Secondary batteries or rechargeable batteries are just some embodiments by which electrical energy can be stored after generation and used (consumed) when required. Owing to the significantly better power density, there has been a departure in recent times from water-based secondary batteries to development of batteries in which the charge transport is accomplished by lithium ions.

However, the energy density of conventional lithium ion batteries which have a carbon anode and a cathode based on metal oxides is limited. New horizons have been opened up by lithium-sulfur cells. In lithium-sulfur cells, sulfur in the sulfur cathode is reduced via polysulfide ions to $S^{2-}$, which is reoxidized when the cell is charged.

A problem, however, is the solubility of the polysulfides, for example $Li_2S_4$ and $Li_2S_6$, which are soluble in the solvent and can migrate to the anode. The consequences may include: loss of capacitance and deposition of electrically insulating material on the sulfur particles of the electrode. The migration from cathode to anode can ultimately lead to discharge of the affected cell and to cell death in the battery. This unwanted migration of polysulfide ions is also referred to as "shuttling", a term which is also used in the context of the present invention.

There are numerous attempts to suppress this shuttling. For example, J. Wang et al. propose adding a reaction product of sulfur and polyacrylonitrile to the cathode; *Adv. Funct. Mater.* 2003, 13, 487 ff. This forms a product which arises by elimination of hydrogen from polyacrylonitrile with simultaneous formation of hydrogen sulfide.

It has additionally been proposed to use sulfides instead of sulfur, for example $CuS$, $FeS_2$ or 2,5-dimercapto-1,3,4-thiadiazole. However, the capacitance of such cells was unsatisfactory; see, for example, P. Wang, *J. Electrochem. Soc.* 2002, A1171-1174, 149 and J. Wang et al., *J. Power Sources* 2004, 138, 271.

It has additionally been proposed to use the sulfur in finely dispersed form; see J. Wang et al., *J. Power Sources* 2004, 138, 271. At high current density, however, fluctuations in efficiency were observed, which the authors attribute to deposition of lithium dendrites. These can be troublesome in that they lead to internal short circuits.

It has additionally been proposed to mix the reaction product of sulfur with polyacrylonitrile with carbon black, and to press it to electrodes; J. Wang et al., *Adv. Mater.* 2002, 14, 963 ff. When such electrodes are combined with a polymer as the electrolyte, a decrease in the shuttling mechanism is observed. However, many polymer electrolytes have low conductivity.

It was thus an object of the present invention to provide a cathode material which is simple to produce and which avoids the disadvantages known from the prior art. It was a further object of the present invention to provide a process by which a corresponding cathode material can be produced.

Accordingly, the materials defined at the outset have been found.

The inventive materials are composite materials, which are also referred to as inventive composite materials in the context of the present invention. Composite materials are understood to mean materials which are solid mixtures which cannot be separated manually and which have different properties than the individual components. The inventive materials are, especially, particulate composite materials.

Inventive composite material comprises a reaction product of
(A) at least one organic polymer, referred to as polymer (A) or organic polymer (A) for short, the expression polymer in the context of the present invention comprising homopolymers and also copolymers,
(B) sulfur,
(C) carbon in a polymorph which comprises at least 60% $sp^2$-hybridized carbon atoms.

Polymer (A) can be selected from any organic polymers and copolymers, preferably from polymers obtainable by anionic or free-radical (co)polymerization.

In another variant, polymer (A) can be selected from organic polyesters, especially from aliphatic polyesters.

In one embodiment of the present invention, polymer (A) is selected from (co)polymers obtainable by anionic, catalytic or free-radical (co)polymerization, especially from polyethylene, polyacrylonitrile, polybutadiene, polystyrene and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile, also referred to as polyacrylonitrile (A) in the context of the present invention.

In the context of the present invention, polyacrylonitrile is not only understood to mean polyacrylonitrile homopolymers, but also copolymers of acrylonitrile with 1,3-butadiene or styrene. Preference is given to polyacrylonitrile homopolymers.

In one embodiment of the present invention, polyacrylonitrile (A) is present after the reaction, i.e. in the inventive composite material, at least partially in the form of a cyclization product of the formula (I)

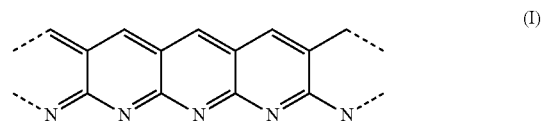

In the context of the present invention, polyethylene is understood to mean not only homopolyethylene but also copolymers of ethylene which comprise at least 50 mol % of ethylene in copolymerized form, and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of propylene in copolymerized form, and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred polymer (A) is polybutadiene.

In one embodiment of the present invention, polymer (A) is selected from those which, before the reaction, have a mean molecular weight $M_w$ in the range from 50 000 to 500 000 g/mol, preferably to 250 000 g/mol.

In one embodiment of the present invention, polyacrylonitrile (A) is selected from those polyacrylonitriles which, before the reaction, have a mean molecular weight $M_w$ in the range from 10 000 to 500 000 g/mol.

Polymer (A) may be crosslinked or uncrosslinked (co)polymers.

Sulfur (B) is known as such and can also be referred to for short as sulfur in the context of the present invention.

Carbon in a polymorph which comprises at least 60% $sp^2$-hybridized carbon atoms, preferably at least 75% $sp^2$-hybridized carbon atoms, also referred to as carbon (C) for short in the context of the present invention, is known as such. For instance, carbon (C) may be graphite.

FIGURES in % are based on all of the carbon (C) incorporated into inventive composite material under chemically reactive conditions, including any impurities, and denote percent by weight.

In one embodiment of the present invention, carbon (C) is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, carbon (C) is partially oxidized carbon black.

In one embodiment of the present invention, carbon (C) comprises carbon nanotubes. Carbon nanotubes (CNTs for short), for example single-wall carbon nanotubes, SW CNT) and preferably multiwall carbon nanotubes (MW CNT), are known per se. A process for preparation thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be prepared by processes known per se. For example, a volatile carbon compound, for example methane or carbon monoxide, acetylene or ethylene, or a mixture of volatile carbon compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, in the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbon-containing compounds in a light arc, specifically in the presence or absence of a decomposition catalyst.

In one embodiment, the decomposition of volatile carbon-containing compound or carbon-containing compounds is performed in the presence of a decomposition catalyst, for example Fe, Co or preferably Ni.

At least two of the aforementioned starting materials have reacted chemically with one another in the course of preparation of inventive composite material, preferably polymer (A) and sulfur. In this context, it is not necessary that polymer (A) and sulfur have entered into covalent bonds with one another. For example, it is possible that sulfur serves merely as an oxidizing agent and is removed from the reaction mixture as $H_2S$.

In one embodiment of the present invention, polymer (A) and sulfur (B) have entered into covalent bonds in the course of formation of inventive composite material.

Inventive composite material further comprise particles or domains which comprise carbon (C) filled with sulfur (B). In one embodiment of the present invention, sulfur is molecularly dispersed in carbon (C) in such particles or domains, for example in the form of $S_8$ rings or in the form of linear sulfur molecules, for example linear $S_8$ molecules.

Such particles or domains can be detected, for example, by electron probe microanalysis.

In one embodiment of the present invention, the pores of carbon (C) in such particles or domains are at least partially filled with sulfur (B).

Such particles or domains may have a mean diameter in the range from 10 to 100 µm, preferably to 70 µm.

These particles are removable mechanically from inventive composite material. Domains are not removable mechanically from inventive composite material. Domains and particles are readily identifiable under the microscope.

In one embodiment of the present invention, such particles or domains comprise carbon (C) and sulfur (B) in a weight ratio in the range from 2:1 to 1:15, preferably 1:1.5 to 1:10.

Above-described particles or domains preferably appear black to the human eye.

In one embodiment of the present invention, above-described particles or domains comprise not more than 5% by weight of polymer (A) or not more than 5% by weight of above-described reaction product. In a specific embodiment of the present invention, neither polymer (A) nor above-described reaction product can be detected in the above-described particles or domains.

Inventive composite material may further comprise particles or domains which comprise significant proportions of above-described reaction product, for example to an extent of at least 10% by weight. The latter particles or domains may have a diameter in the range from 5 to 75 µm, preferably 10 to 50 µm. They are preferably smaller than the former particles or domains.

In one embodiment of the present invention, inventive composite material comprises in the range from 20 to 80% by weight, preferably 30 to 70% by weight, of sulfur, determined by elemental analysis.

In one embodiment of the present invention, inventive composite material comprises in the range from 0.1 to 30% by weight of carbon (C), preferably 1 to 20% by weight. This carbon is likewise determinable, for example, by elemental analysis, though it must be taken into account in the evaluation of the elemental analysis that carbon also gets into inventive composite material via polymer (A).

In one embodiment of the present invention, inventive composite material further comprises at least one binder (D). Binder (D) serves principally for mechanical stabilization of inventive composite material.

In one embodiment of the present invention, binder (D) is selected from organic (co)polymers. Examples of suitable organic (co)polymers may be halogenated or halogen-free. Examples are polyethylene oxide (PEO), cellulose, carboxymethylcellulose, polyvinyl alcohol, polyethylene, polypropylene, polytetrafluoroethylene, polyacrylonitrile-methyl methacrylate copolymers, styrene-butadiene copolymers, tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoridechlorotrifluoroethylene copolymers, ethylene-chlorofluoroethylene copolymers, ethylene-acrylic acid copolymers, optionally at least partially neutralized with alkali metal salt or ammonia, ethylene-methacrylic acid copolymers, optionally at least partially neutralized with alkali metal salt or ammonia, ethylene-(meth)acrylic ester copolymers, polyimides and polyisobutene.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

The mean molecular weight $M_w$ of binder (D) may be selected within wide limits, suitable examples being 20 000 g/mol to 1 000 000 g/mol.

In one embodiment of the present invention, inventive composite material comprises in the range from 0.1 to 10% by weight of binder, preferably 5 to 10% by weight and more preferably 7 to 8% by weight.

Binder (D) can be incorporated into inventive composite material by various processes. For example, it is possible to dissolve soluble binders (D) such as polyvinyl alcohol in a suitable solvent or solvent mixture, water/isopropanol for example being suitable for polyvinyl alcohol, and to prepare a suspension with the further constituents of the cathode. After application to a suitable substrate, the solvent or solvent mixture is removed, for example evaporated, to obtain inventive composite material. A suitable solvent for polyvinylidene fluoride is NMP.

If it is desired to use sparingly soluble polymers as the binder (D), for example polytetrafluoroethylene or tetrafluoroethylene-hexafluoropropylene copolymers, a suspension of particles of the binder (D) in question and of the further constituents of the cathode is prepared, and compressed under hot conditions.

In one embodiment of the present invention, inventive composite material additionally comprises carbon, which is incorporated into the composite material under nonreactive conditions. This additional carbon may be selected from the same materials as carbon (C). It may in each case be the same as or different than carbon (C); for example, the carbon (C) and the additional carbon selected may be two different carbon blacks or graphites.

In one embodiment of the present invention, inventive composite material additionally comprises carbon black which has not been reacted with organic polymer (A) or polyacrylonitrile (A) and sulfur (B).

In one embodiment of the present invention, inventive composite material comprises in the range from 0.1 to 10% by weight of additional carbon, preferably additional carbon black.

Inventive composite materials are particularly suitable as or for production of electrodes, especially for production of electrodes of lithium-containing batteries. The present invention provides for the use of inventive composite materials as or for production of electrodes for electrical cells. The present invention further provides electrical cells comprising at least one electrode which has been produced from or using at least one inventive composite material.

In one embodiment of the present invention, the electrode in question is the cathode, which can also be referred to as the sulfur cathode or S cathode. In the context of the present invention, the electrode referred to as the cathode is that which has reducing action on discharge (operation).

In one embodiment of the present invention, inventive composite material is processed to give electrodes, for example in the form of continuous belts which are processed by the battery manufacturer.

Electrodes produced from inventive composite material may, for example, have thicknesses in the range from 20 to 500 μm, preferably 40 to 200 μm. They may, for example, have a rod-shaped configuration, or be configured in the form of round, elliptical or square columns or in cuboidal form, or as flat electrodes.

In one embodiment of the present invention, inventive electrical cells comprise, as well as inventive composite material, at least one electrode which comprises metallic zinc, metallic sodium or preferably metallic lithium.

In one embodiment of the present invention, inventive electrical cells comprise, in addition to inventive composite material and a further electrode, at least one nonaqueous solvent which may be liquid or solid at room temperature, preferably selected from polymers, cyclic or noncyclic ethers, cyclic and noncyclic acetals, cyclic or noncyclic organic carbonates and ionic liquids.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (II) and (III)

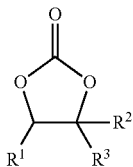

(II)

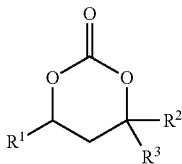

(III)

in which $R^1$, $R^2$ and $R^3$ may be the same or different and are selected from hydrogen and $C_1$-$C_4$-alkyl, for example methyl, ethyl, n-propyl, isopropyl, n-butyl, isobutyl, secbutyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

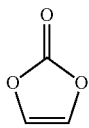

(IV)

The solvent(s) is (are) preferably used in what is known as the anhydrous state, i.e. with a water content in the range from 1 ppm to 0.1% by weight, determinable, for example, by Karl Fischer titration.

In one embodiment of the present invention, inventive electrochemical cells comprise one or more conductive salts, preference being given to lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_mXLi$, where m is defined as follows:

m=1 when X is selected from oxygen and sulfur,
m=2 when X is selected from nitrogen and phosphorus, and
m=3 when X is selected from carbon and silicon.

Preferred conductive salts are selected from $LiC(CF_3SO_2)_3$, $LiN(CF_3SO_2)_2$, $LiPF_6$, $LiBF_4$, $LiClO_4$, particular preference being given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium and toward lithium sulfides and lithium polysulfides. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, the separators selected may be separators made from PET nonwovens filled with inorganic particles. Such separators may have a porosity in the range from 40 to 55%. Suitable pore diameters are, for example, in the range from 80 to 750 nm.

Inventive electrical cells are notable for particularly high capacitances, high performance even after repeated charging, and significantly delayed cell death. Shuttling can be suppressed very efficiently. Inventive electrical cells are very suitable for use in automobiles, aircraft, ships or stationary energy stores. Such uses form a further part of the subject matter of the present invention.

The present invention further provides a process for producing inventive composite materials, which is also referred to as inventive production process in the context of the present invention. To perform the inventive production process, the procedure may be, for example, that (A) at least one organic polymer,
(B) sulfur and
(C) carbon in a polymorph which comprises at least 60% $sp^2$-hybridized carbon atoms, are reacted with one another at temperatures in the range from 150 to 400° C., preferably 200 to 350° C.

In this process, organic polymer (A), sulfur (B) and carbon (C) are each as defined above.

Organic polymer (A) is preferably selected from polyethylene, polypropylene, polyacrylonitrile, polybutadiene, polystyrene and copolymers of at least two comonomers selected from ethylene, propylene, styrene, acrylonitrile and 1,3-butadiene, most preferably from acrylonitrile.

The inventive production process can be performed in the presence of a solvent, for example toluene or ethanol. However, preference is given to performing the inventive production process without solvent.

In one embodiment of the present invention, the inventive production process is performed at ambient pressure, i.e. at standard pressure.

In another embodiment of the present invention, the inventive production process is performed at elevated pressure, for example at 1.1 to 100 bar.

In another embodiment of the present embodiment, the inventive production process is performed at autogenous pressure. For this purpose, it is possible to establish any pressure, for example 10 bar or else standard pressure, and the reaction is performed in a pressure vessel, for example an autoclave. Gaseous by-products which form, especially $H_2S$, can increase the pressure during the reaction, for example to pressures of up to 100 bar or else more. If it is desired to perform the inventive production process under autogenous pressure, the pressure measurement can be used to monitor the reaction.

In one embodiment of the present invention, the inventive production process can be performed over a period in the range from 10 minutes up to 100 hours, preference being given to two to 24 hours.

It is preferred, after the reaction has ended, to free the inventive composite material obtained of $H_2S$, for example to degas it. The degassing can be accomplished, for example, by evacuating or by purging with an inert gas, for example with nitrogen or with a noble gas such as argon.

Inventive composite material is obtained, generally in powder form.

The present invention further provides a process for operating automobiles, aircraft, ships or stationary energy stores using at least one inventive electrical cell.

The invention is illustrated by working examples.

FIGURES in % relate to percent by weight, unless explicitly stated otherwise.

I. Synthesis of Composite Materials

I.1 Synthesis of a Comparative Composite Materials C-CM.1 without Carbon 25 g of sulfur and 20 g of polyacrylonitrile were triturated in a mortar and charged into a 300 ml autoclave. The mixture was heated to 300° C. under autogenous pressure and stirred for 12 hours (300 rpm). In the course of this, the pressure rose to 43 bar. Subsequently, the $H_2S$ formed was vented off via NaOH scrubbers, and the resulting comparative composite material C-CM.1 was purged with nitrogen over a period of 24 hours. 38 g of hard, dark gray to black powder C-CM.1 were obtained.

Elemental Analysis:
C=35.4 g/100 g
S=50.6 g/100 g
N=12.4 g/100 g
H=1.7 g/100 g.

I.2 Synthesis of an Inventive Composite Material CM.2

20 g of sulfur, 10 g of polyacrylonitrile and 6 g of carbon black (commercially available as Ketjen Black) were triturated in a mortar and charged into a 300 ml autoclave. The mixture was heated to 280° C. under autogenous pressure and stirred for 12 hours (300 rpm). In the course of this, the pressure rose to 43 bar. Subsequently, the $H_2S$ formed was vented off via NaOH scrubbers, and the resulting inventive composite material CM.2 was purged with nitrogen over a period of 24 hours. 29.4 g of hard, dark gray to black powder were obtained.

Elemental Analysis:
C=43.5 g/100 g
S=45.8 g/100 g
N=7.5 g/100 g
H=1.4 g/100 g.

EPMA (electron probe microanalysis) was used to analyze a sample of inventive composite material CM.2. The elemental distribution was determined by EDXS at 20 kV (EDXS: Energy Dispersive X-Ray Spectroscopy). It comprised particles which had a mean diameter in the range from 20 to 70 µm and which consisted of sulfur-filled carbon black. In addition, the sample of inventive composite material CM.2 comprised particles which comprised reaction product of polyacrylonitrile with sulfur and carbon black and which had a mean diameter in the range from 5 to 50 µm.

II. Production of an Inventive Electrochemical Cell 1.05 g of inventive composite material CM.2, 0.352 g of Super P® carbon black, mean particle diameter: 0.04 µm, BET surface area: 62 m²/g 0.07 g of graphite, mean particle diameter: 1.6 µm, BET surface area: 20 m²/g 0.1 g of polyvinyl alcohol as binder (D.1), commercially available as Celvol®, were mixed together. The mixture was dispersed in a solvent mixture composed of 65% $H_2O$, 30% isopropanol and 5% 1-methoxy-2-propanol, and the dispersion thus obtained was stirred for 10 hours.

Thereafter, the dispersion was knife-coated onto Al foil, and dried at 40° C. under reduced pressure for 10 hours.

For production of a comparative cathode, the procedure was analogous, except that inventive composite material CM.2 was replaced by C-CM.1.

III. Testing of the Inventive Electrochemical Cell

For the electrochemical characterization of the inventive composite material CM.2, an electrochemical cell was built according to FIG. 1.

Anode: Li foil, thickness 50 µm,

Separator: polyethylene film, thickness 15 µm, porous

Cathode according to example II.

Electrolyte: 8% by weight of $LiN(SO_2CF_3)_2$, 46% by weight of 1,3-dioxolane and 46% by weight of 1,2-dimethoxyethane.

The annotations in FIG. 1 mean:

1, 1' die 2, 2' nut 3, 3' sealing ring—double in each case, the second, somewhat smaller sealing ring in each case is not shown here 4 spiral spring 5 output conductor made from nickel 6 housing The charging and discharging of the cell was carried out with a current of 4.19 mA at potentials in the range of 1.8-2.5. The cell capacitance was 41.2 mA·h. Results are summarized in table 1.

TABLE 1

Test results of electrochemical cells according to the invention and electro-chemicals not acording to the invention

| Example | Capacitance 1st cycle [mA · h/gS] | Capacitance 5th cycle [mA · h/gS] | Capicitance 200th cycle [mA · h/gS] |
|---|---|---|---|
| Cathode based on C-CM.1 | 530 | 360 | — |
| Cathode based on CM.2 | 1000 | 900 | 550 |

The invention claimed is:

1. A process for producing composite materials, which comprises reacting
   a. at least one organic polymer,
   b. sulfur and
   c. carbon in a polymorph which comprises at least 60% $sp^2$-hybridized carbon atoms,
   with one another at temperatures in the range from 200 to 400° C.

2. The process according to claim 1, wherein said organic polymer is selected from polyethylene, polypropylene, polyacrylonitrile, polybutadiene, polystyrene and copolymers of at least two comonomers selected from ethylene, propylene, styrene, acrylonitrile and 1,3-butadiene.

3. The process according to claim 1, wherein said organic polymer (A) is a polyacrylonitrile.

4. The process according to claim 1, wherein said polyacrylonitrile is present after the reaction at least partially in the form of a cyclization product of the formula I

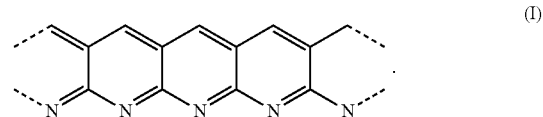

(I)

5. The process according to claim 1, wherein said carbon is carbon black.

6. The process according to claim 1, wherein said polyacrylonitrile before the reaction has a mean molecular weight $M_w$, in the range from 50 000 to 250 000 g/mol.

7. The process according to claim 1, further comprising a binder (D).

8. The process according to claim 1, which further comprises carbon black which has not been reacted with said polyacrylonitrile and said sulfur.

9. A process for producing composite materials, which comprises reacting
   a. at least one organic polymer,
   b. sulfur and
   c. carbon in a polymorph which comprises at least 60% sp$^2$-hybridized carbon atoms,
   with one another at temperatures in the range from 200 to 400° C.,
   wherein in said reacting particles or domains which comprise said carbon filled with said sulfur are formed.

10. The process according to claim 9, wherein said organic polymer is selected from polyethylene, polypropylene, polyacrylonitrile, polybutadiene, polystyrene and copolymers of at least two comonomers selected from ethylene, propylene, styrene, acrylonitrile and 1,3-butadiene.

11. The composite material process according to claim 9, wherein said organic polymer is a polyacrylonitrile.

12. The process according to claim 11, wherein said polyacrylonitrile is present after the reaction at least partially in the form of a cyclization product of the formula I

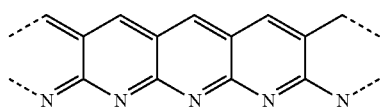

13. The process according to claim 9, wherein said carbon is carbon black.

14. The process according to claim 9, wherein said polyacrylonitrile before the reaction has a mean molecular weight $M_w$ in the range from 50 000 to 250 000 g/mol.

15. The process according to claim 9, further comprising a binder (D).

16. The process according to claim 9, which further comprises carbon black which has not been reacted with said polyacrylonitrile and said sulfur.

* * * * *